(12) United States Patent
Low

(10) Patent No.: US 10,477,844 B2
(45) Date of Patent: Nov. 19, 2019

(54) FISHING LURE

(71) Applicant: Yet Sun Low, Kuala Lumpur (MY)

(72) Inventor: Yet Sun Low, Kuala Lumpur (MY)

(*) Notice: Subject to any disclaimer, the term of this patent is extended or adjusted under 35 U.S.C. 154(b) by 99 days.

(21) Appl. No.: 14/781,066

(22) PCT Filed: Apr. 4, 2013

(86) PCT No.: PCT/MY2013/000074
§ 371 (c)(1),
(2) Date: Sep. 29, 2015

(87) PCT Pub. No.: WO2014/163477
PCT Pub. Date: Oct. 9, 2014

(65) Prior Publication Data
US 2016/0037758 A1 Feb. 11, 2016

(51) Int. Cl.
*A01K 85/02* (2006.01)
(52) U.S. Cl.
CPC .................................. *A01K 85/02* (2013.01)
(58) Field of Classification Search
CPC ........ A01K 85/14; A01K 85/00; A01K 85/02; A01K 85/18; A01K 85/16
USPC ........................... 43/42.5, 42.4, 42.43, 42.41
See application file for complete search history.

(56) References Cited

U.S. PATENT DOCUMENTS

| 3,494,062 | A | 2/1970 | Gardner |
| 4,878,310 | A * | 11/1989 | Hannon ................ A01K 85/02 |
|  |  |  | 43/42.04 |
| 4,922,645 | A | 5/1990 | Hannon et al. |
| 6,301,822 | B1 * | 10/2001 | Zernov ................ A01K 85/01 |
|  |  |  | 43/42 |
| 2010/0146837 | A1 | 6/2010 | Zernov |
| 2012/0011762 | A1 * | 1/2012 | Magazzu ............... A01K 83/00 |
|  |  |  | 43/43.16 |

FOREIGN PATENT DOCUMENTS

| JP | 2001321023 A | 11/2001 |
| JP | 2003079278 A | 3/2003 |
| JP | 2009089707 | 4/2009 |

* cited by examiner

*Primary Examiner* — Peter M Poon
*Assistant Examiner* — Jeffrey R Larsen
(74) *Attorney, Agent, or Firm* — Renner Kenner Greive Bobak Taylor & Weber

(57) ABSTRACT

A fishing lure for fishing in streams, rivers and lakes, comprising a body (1), a fishing line coupler (2) for connecting the body to a fishing line, a fishing hook (3), a fishing hook coupler (4) coupling the fishing hook (3) to the body (1), and a fishing hook receiver (5) mounted to the body such that the fishing hook (3) and the fishing hook receiver (5) are attracted to each other by way of magnetic attraction so that when in use, the fishing hook (3) is less prone to get caught by objects such as pebbles, rocks or tree branches, where most of the fishes tend to hide.

6 Claims, 6 Drawing Sheets

FISHING LURE

TECHNICAL FIELD

The present invention generally relates to fishing equipment. The invention particularly relates to a fishing lure.

BACKGROUND ART

Recreational fishing has been around as long as commercial and subsistence fishing. The most common form of recreational fishing is done with a rod, reel, line, hooks and a wide range of baits and fishing lures. Most fishing lures have hooks dangling from a body that has been carved or painted to look like fish or objects that attract the fishermen's prey.

The hook is generally large enough to cut through and dangle live bait such as earth worms or other smaller fishes so that the intended prey would be attracted to it. Once a prey bites onto the bait, the sharp end of the hook will tear through its mouth from within, preventing it from escaping.

One of the downsides of this type of hook is that it is always dangling downward, especially when carrying bait. Since recreational fishing happens mostly along rivers or over lakes, it is quite easy for the hook to accidentally latch onto objects other than an actual fish. Rocks, pebbles, branches and tree trunks can easily trap the sharp end of the hook, especially when the above objects are being carried by a strong current. Moreover, fishes tend to hide around these objects, so the fishermen generally are being forced to cast their fishing lines near them.

SUMMARY OF INVENTION

As such, it is desirable to have a fishing lure that is able to retract its fishing hook to the point where the sharp end of the hook is less likely to latch onto objects in the water other than fishes, while at the same time being able to release the hook once the prey has bitten onto it.

According to one aspect of the invention, there is provided a fishing lure comprising
a body;
a fishing line coupler for connecting the body to a fishing line;
a fishing hook;
a fishing hook coupler coupling the fishing hook to the body; and
a fishing hook receiver mounted to the body;
wherein the fishing hook and the fishing hook receiver are biased toward each other by way of magnetic attraction so as to retain the hook in a position adjacent to the body, and
the fishing hook receiver includes a receiver slot for locating and receiving an open end of the fishing hook when in said retained position;
wherein the fishing hook receiver is disc-shaped, and the receiver slot is diametrically positioned on the fishing hook receiver.

The invention introduces a novel fishing lure that has the ability to retract its fishing hook by biasing the hook and the fishing lure's body together, through the use of magnetism. A magnetized fishing hook receiver mounted on the fishing lure's body pulls the fishing hooks toward the fishing lure's body.

The fishing hook coupler is positioned so that one of the open ends of the hook aligns with a receiver slot on the fishing hook receiver. This further allows the fishing hook to latch securely onto the fishing lure's body when the fishing lure is in the water.

In an embodiment, the magnetic field biasing the fishing hook and the fishing hook receiver to each other is in the range of 1000 to 1200 gauss (G).

The strength of the magnetic field determines if the fishing hook is being pulled just enough toward the lure's body. If the strength of the magnet is too strong, the fishing hook will fail to disengage when a fish bites onto it, and if the strength of the magnet is too weak, the fishing hook receiver would not be able to hold onto the fishing hook while it is in the water.

In another embodiment, the fishing hook receiver is magnetic and the fishing hook comprises metal.

In yet another embodiment, the fishing hook receiver comprises metal and the fishing hook is magnetic.

It is possible for either the fishing hook receiver or the fishing hooks to be magnetized.

According to one preferred feature, the fishing hook, the fishing hook coupler, and the fishing hook receiver are respectively provided on each of two opposite sides of the body.

The fishing lure may contain more than one set of fishing hook, fishing hook coupler and fishing hook receiver, depending on design choice.

In one embodiment, the width of the body is equal to or greater than the widest portion of the fishing hook such that it camouflages the fishing hook from the prey when it is biased toward the fishing hook receiver.

To further conceal the hook from the prey, the fishing lure body and fishing hooks are fabricated to be around the same dimensions, so that when the fishing hook is biased toward to the fishing lure body, the hook would appear to be partly hidden by the fishing lure body.

BRIEF DESCRIPTION OF THE DRAWINGS

The invention is illustrated, but not limited, by the following description of preferred embodiments, that is given by way of example only with reference to the accompanying drawings, in which.

DETAILED DESCRIPTION

Figure 1:
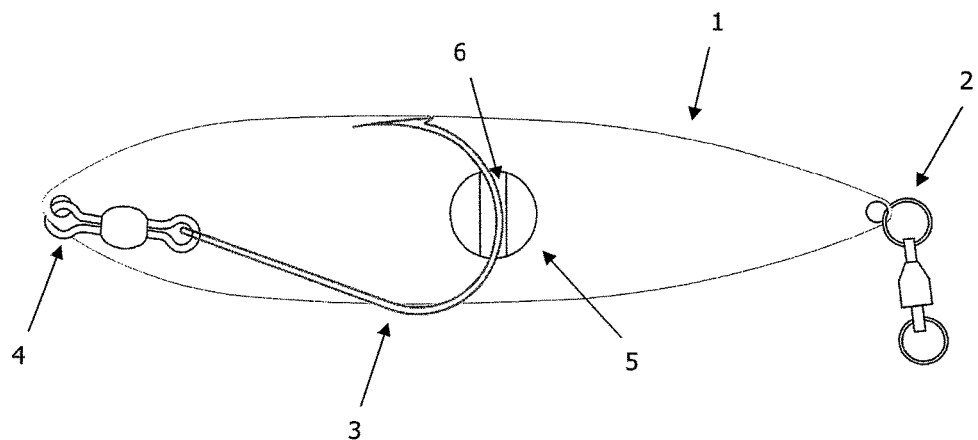
FIG. 1 is an illustration of an embodiment of the present invention, a fishing lure comprising the basic components of a typical fishing lure, plus a fishing hook receiver used to receive the single fishing hook coupled to the fishing lure's body.
Figure 2:
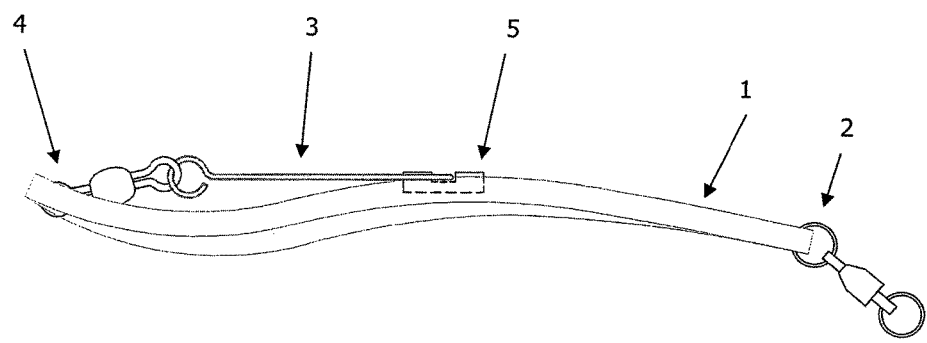
FIG. 2 shows the side view of the same fishing lure in FIG. 1, indicating how the fishing hook receiver is mounted on the fishing lure's body.

A fishing lure, in an embodiment of the present invention, is illustrated in FIGS. 1 and 2. The body 1 of the fishing lure is slightly curved to resemble a fish, and is painted with an image of a fish. A fishing line coupler 2 is positioned on one end of the fishing lure body and is painted with the fish's head. A fishing hook coupler 4 is mounted on the other end of the fishing lure body. A fishing hook 3 is mounted to the fishing hook coupler 4, and a fishing hook receiver 5, which shapes like a circular disc, containing a receiver slot 6, is embedded in the center portion along the fishing lure's length. The fishing hook receiver 5 is magnetized, having a magnetic field between 1000 to 1200 gauss (G). The receiver slot 6 allows the fishing hook 3 to latch onto the fishing hook receiver 5 more easily.

The fishing line coupler 2 ties the fishing lure to a fishing line (not shown) so that the fishing lure body may hang freely in the water. The fishing hook 3 has a retained position along its movable axes, where the end of the fishing hook 3 meets with the receiver slot 6 of the fishing hook receiver 5. At this position, the fishing hook 3 is magnetically latched to the fishing hook receiver 5.

When in use, the required bait is placed on the fishing hook 3, and the hook 3 is moved into the retained position until it latches onto the fishing hook receiver 5. The magnetic field between 1000 to 1200 gauss (G) provided by the fishing hook receiver 5 is just enough to keep the fishing hook 3 and bait on the fishing lure body 1, but once a prey bites onto the bait, the hook 3 will disengage itself from the fishing hook receiver 5.

The reaction to the piercing pain of the fishing hook 3 causes both the prey and fishing line to shake and shift haphazardly, alerting the fisherman that something has been caught on the fishing hook.

Other types of fishing lure in a second embodiment of the invention are shown from FIG. 3 through 12. The features are the same as for the first embodiment, except as for the differences hereafter.

Figure 3:
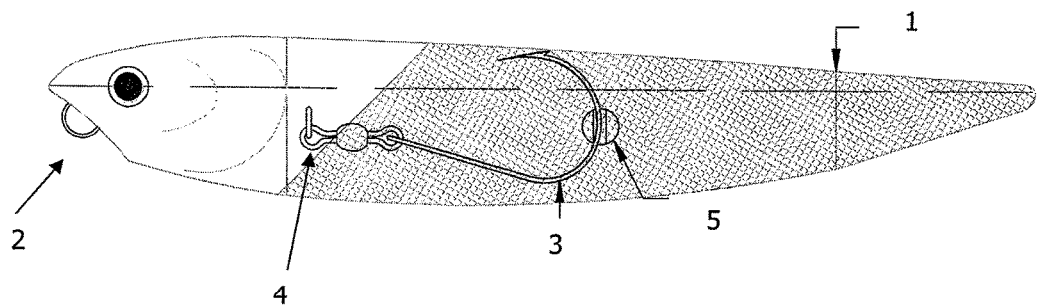
FIG. 3 is an illustration of another embodiment of the present invention, where two fishing hooks and two complementary fishing hook receivers are present on a single fishing lure's body.
Figure 4:
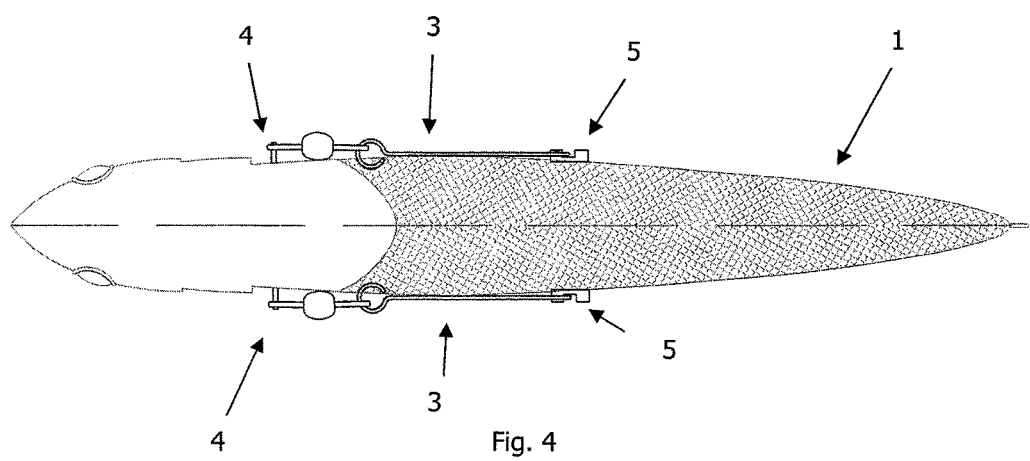
FIG. 4 shows the side view of the fishing lure in FIG. 2, indicating how the fishing hook receivers are mounted on the fishing lure's body.

FIGS. 3 and 4 show the first variation of this second embodiment. In the first variation, it can be seen in the drawings that the fish lure body 1 is larger than the fish lure body 1 in the embodiment illustrated in FIGS. 1 and 2. The body 1 of the fish lure is molded to look like a fish. In the first variation, one fishing line coupler is mounted on one end of the body 1. Two fishing hook couplers 4 are mounted near the "fins" of the lure body 1, one on each side of the body, as shown in FIG. 4. A fishing hook 3 is coupled to each of the fishing hook couplers. Similarly, two magnetized fishing hook receivers 5 are mounted on either side of the fishing lure body 1. By having two fishing hooks 3, the fishing lure has the potential to capture more fish by being able to attract them from either side of the body 1. Also, as the position of the fishing line coupler will result in the fishing lure body's tail facing down when it is lowered into the water, the fishing hook 3 will automatically latch onto the fishing hook receiver 5.

Figure 5:
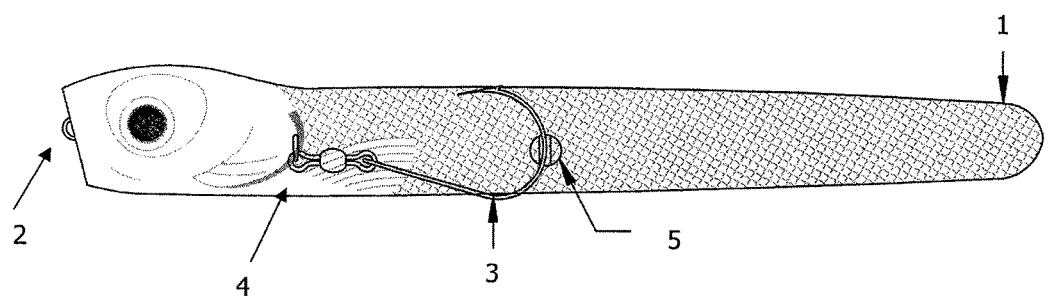
FIG. 5 shows another variation of the present invention, where two fishing hooks and two complementary fishing hook receivers are present on a single fishing lure's body.
Figure 6:
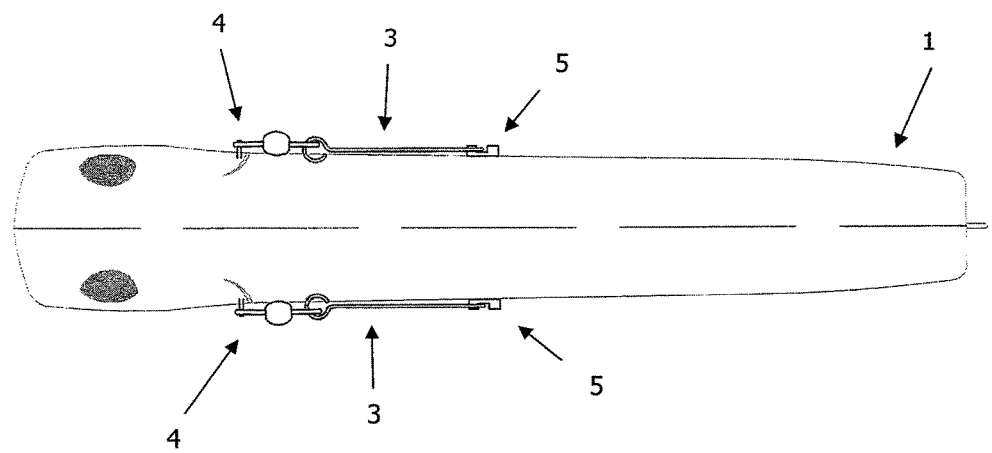
FIG. 6 shows the side view of the fishing lure in FIG. 5, indicating how the fishing hook receiver keeps the fishing hook concealed along the body of the fishing lure when the fishing hook and the fishing hook receiver are biased toward each other.

The second variation of the fishing lure is illustrated in FIGS. 5 and 6. While the body 1 of the second variation is significantly longer than that of the first variation, the positions of the fishing line coupler 2, fishing hook coupler 4, the fishing hook 3 and the fishing hook receiver 5 are at the same positions as the first variation. The lure body 1 is molded in a different shape to attract a different type of prey. By having two fishing hooks 3, the fishing lure has the potential to capture more fish by being able to attract them from either side of the body 1. And again, as the position of the fishing line coupler will result in the fishing lure body's tail facing down when it is lowered into the water, the fishing hook 3 will automatically latch onto the fishing hook receiver 5.

Figure 7:
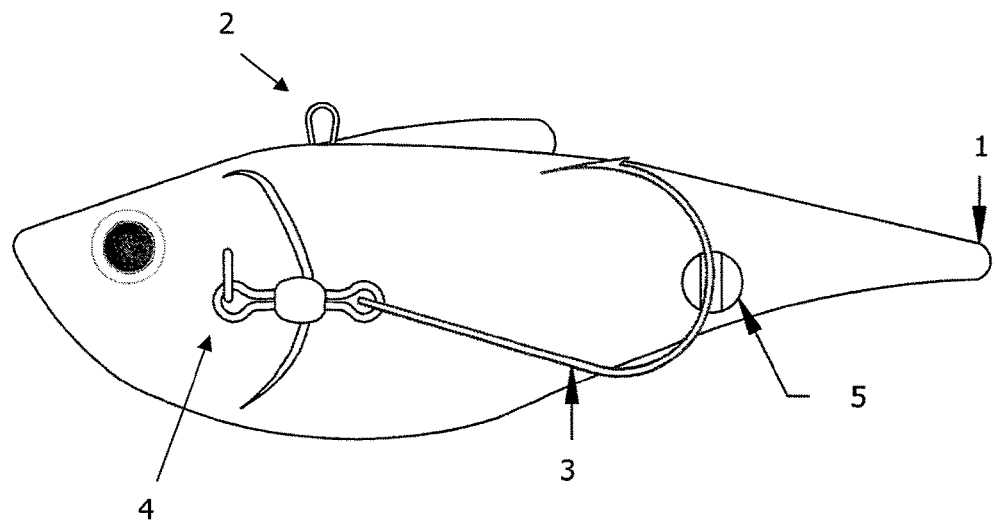
FIG. 7 illustrates yet another variation of the fishing lure according to an embodiment of the present invention.
Figure 8:
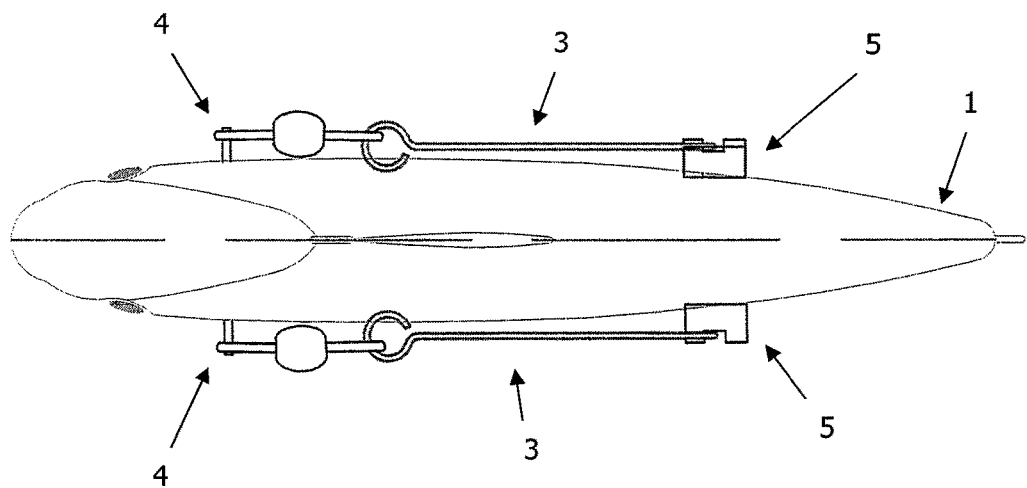
FIG. 8 shows the side view of the same variation of the fishing lure according to FIG. 7, indicating the positions of the fishing hook receivers in relation to the fishing hooks on the fishing lure's body.

The third variation of the fishing lure is shown in FIGS. 7 and 8. In this variation, the fishing line coupler 2 is mounted on the top of the fishing lure body 1. The fishing hook coupler 4 is mounted on each side of the fishing lure body 1, with a fishing hook on each side of the lure body 1 almost as long as the smaller fishing lure. The magnetized fishing hook receiver 5, on either side of the lure body, is mounted closer to the tail of the fishing lure body 1. Each fishing hook 3 needs to be manually latched to the fishing hook receiver 5. By having two fishing hooks 3, the fishing lure has the potential to capture more fish by being able to attract them from either side of the body 1.

Figure 9:
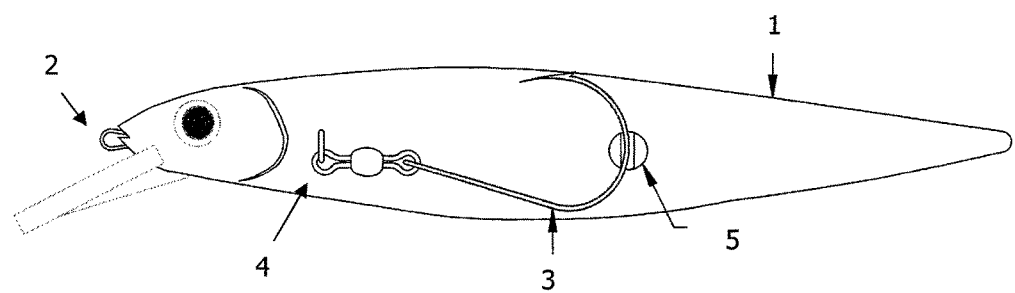
FIG. 9 shows another example of an embodiment of the present invention.
Figure 10:
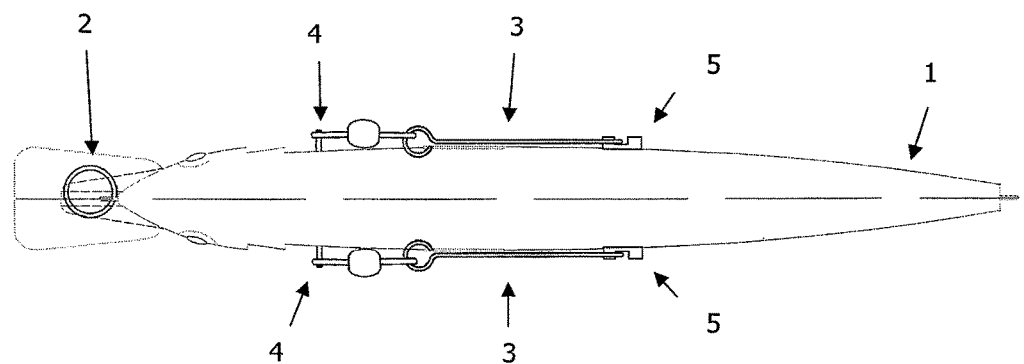
FIG. 10 illustrates the side view of the fishing lure according to FIG. 9, showing the positions of the fishing hook receivers in relation to the fishing hooks on the fishing lure's body.

The fourth variation of the fishing lure is illustrated in FIGS. 9 and 10. This type of fishing lure is more popularly known as a crankbait, a popular choice for bass fishing. The fishing line coupler 2 is mounted at the mouth of the lure body 1, just above the clear plastic bill. The primary purpose of the bill is to get the bait down to the required depth, with a fish-like swimming action imparted during the retrieve. The fishing hooks coupler 4 are mounted on each side of the lure body 1, and each of the attached fishing hook 3 extends halfway to the tail of the body 1. A fishing hook receiver 5 is mounted on each side of the fishing lure body 1.

As the position of the fishing line coupler will result in the fishing lure body's tail facing down when it is lowered into the water, the fishing hook 3 will automatically latch onto the fishing hook receiver 5. By having two fishing hooks 3, the fishing lure has the potential to capture more fish by being able to attract them from either side of the body 1.

Figure 11:
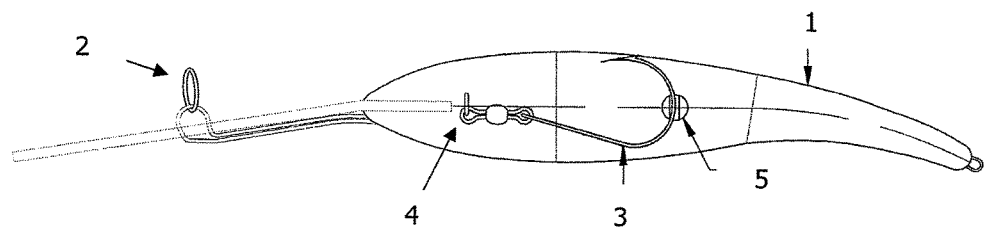
FIG. 11 illustrates another example of an embodiment according to the present invention, where the body of the fishing lure is suspended from a transparent acrylic material that will appear almost transparent under water.
Figure 12:
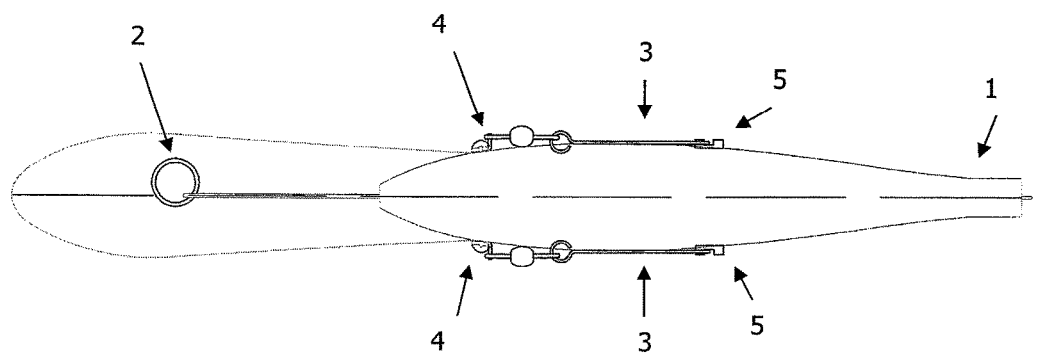
FIG. 12 shows the side view of the fishing lure according to FIG. 11, showing the positions of the fishing hook receivers in relation to the fishing hooks on the fishing lure's body.

The fifth variation of the fishing lure is shown in FIGS. 11 and 12. This type of fishing lure is another variant of a crankbait, with a longer plastic and larger bill so that the lure body 1 can dive deeper into the water. Due to the length of the bill, the fishing line coupler 2 is extended all the way out of the fishing lure body, parallel with the bill, while the fishing hook coupler 4 is placed around the fin area of the fish. The fishing hook 3 is mounted on each side of the fishing lure body 1, and the embedded fishing hook receivers 5 are located around the center portion of the lure body 1.

As the position of the fishing line coupler will result in the fishing lure body's tail facing down when it is lowered into the water, the fishing hook 3 will automatically latch onto the fishing hook receiver 5. By having two fishing hooks 3, the fishing lure has the potential to capture more fish by being able to attract them from either side of the body 1.

As can been seen from the drawings, although the body 1 of each fishing lures differs from the others, each one of them comes with a set of fishing hook couplers 4, a set of fishing hooks 3, and a set of fishing hook receivers 5. These fishing lures are more cylindrical in shape and are molded to resemble actual fishes. Although the shapes and sizes of these fishing lures differ greatly, it can be seen that the arrangement of the fishing hook couplers 4, fishing hooks 3 and the fishing hook receivers 5 are done based on the same arrangements and principles as FIGS. 1 and 2.

The magnetic strength used for the fishing hook receivers 5 are shared by all the fishing lure designs in the present invention. It is also to be noted that, as an alternative arrangement, the fishing hook receivers 5 may be made of non-magnetized metals, whereas the hooks 3 are made of magnetized materials to create the same biasing effect as intended by the present invention.

Therefore, it is obvious from that the above description that the present invention provides a fishing lure that is able to more effectively navigate across streams, rivers and lakes where the waters are shallow and the fishes are abundant. The biasing and latching effect of the magnetized fish hook receiver 5 allows the fishing lure to be placed near areas where the hooks are easily caught or trapped by pebbles, rocks or tree branches, thereby making it easier for fishermen to catch their prey.

Although the above description has focused mainly on two particular embodiments of the invention whereby the fishing lure contains either one set or two sets of the fishing hook 3, fishing hook coupler 4 and fishing hook receiver 5 arrangement, it should be obvious to a skilled person in the art that an inclusion of a third or more sets of the above fishing hook, hook coupler and fishing hook receiver arrangement is possible.

It is understood that the invention may be embodied in numerous other ways without departing from the scope of the invention.

The invention claimed is:
1. A fishing lure comprising
   a body;
   a fishing line coupler for connecting the body to a fishing line;
   a fishing hook;
   a fishing hook coupler coupling the fishing hook to the body;
   a fishing hook receiver mounted to the body;
   the fishing hook and the fishing hook receiver are biased toward each other by way of a magnetic field so as to retain the hook in a position adjacent the body; and
   the fishing hook receiver includes a receiver slot for locating and receiving an open end of the fishing hook when in said retained position such that the open end of the fishing hook lies flush against the body of the fishing lure;
   wherein the fishing line coupler and the fishing hook coupler are located on different positions on the body; and
   wherein the fishing hook receiver is disc-shaped, and the receiver slot is diametrically positioned on the fishing hook receiver.

2. A fishing lure according to claim 1, wherein the magnetic field biasing the fishing hook and the fishing hook receiver to each other is in the range of 1000 to 1200 gauss.

3. A fishing lure according to claim 1, wherein the fishing Zhook receiver is magnetic and the fishing hook comprises metal.

4. A fishing lure according to claim 1, wherein the fishing hook receiver comprises metal and the fishing hook is magnetic.

5. A fishing lure according to claim 1, wherein the fishing hook, the fishing hook coupler, and the fishing hook receiver are respectively provided on each of two opposite sides of the body.

6. A fishing lure according to claim 1, wherein the width of the body is equal to or greater than the widest portion of the fishing hook such that it camouflages the fishing hook from prey when it is biased toward the fishing hook receiver.

* * * * *